United States Patent [19]

Ishii et al.

[11] 4,049,984
[45] Sept. 20, 1977

[54] ELECTRIC MOTOR

[75] Inventors: Hirohisa Ishii, Tokyo; Masami Shishikura, Yokohama, both of Japan

[73] Assignee: Sony Corporation, Tokyo, Japan

[21] Appl. No.: 686,075

[22] Filed: May 13, 1976

[30] Foreign Application Priority Data

May 22, 1975 Japan .................................. 50-61278

[51] Int. Cl.$^2$ ............................................ H02K 15/00
[52] U.S. Cl. ...................................... 310/42; 310/112; 310/168; 310/241
[58] Field of Search ............ 310/42, 89, 112, 162–165, 310/168, 241, 229, 412

[56] References Cited

U.S. PATENT DOCUMENTS

| | | | |
|---|---|---|---|
| 2,760,095 | 8/1956 | LeTourneau | 310/241 |
| 3,480,813 | 11/1969 | Sillano | 310/241 |
| 3,508,326 | 4/1970 | Tamm | 310/241 X |
| 3,663,851 | 5/1972 | Persson | 310/241 X |
| 3,909,642 | 9/1975 | Busian | 310/42 |

*Primary Examiner*—Donovan F. Duggan
*Attorney, Agent, or Firm*—Lewis H. Eslinger; Alvin Sinderbrand

[57] ABSTRACT

In order to facilitate the automated assembly of an electric motor, all of the major components and sub-assemblies thereof are successively brought together in one axial direction. Such major components of the motor include a first cylindrical case, preferably of aluminum, having an end wall at only one end so as to slidably receive, through its other open end, a second magnetic cylindrical case which is relatively shorter than the first case and which opens in the same axial direction for receiving and housing a cylindrical magnet, a rotor assembly insertable through the open end of the second case and including a shaft with a rotor and commutator thereon, a brush base insertable in the open end of the first case so as to bear against the open end edge of the second case and carrying brushes at one side to engage the commutator and a frequency generator at its other side, and a lid member carrying a central thrust bearing for engagement by the respective end of the shaft when the lid member is engaged with the open end of the first case for closing the latter and for bearing against the frequency generator.

11 Claims, 6 Drawing Figures

ELECTRIC MOTOR

BACKGROUND OF THE INVENTION

1. Field of the Invention

This invention relates generally to electric motors, and more particularly is directed to an improved structural arrangement of an electric motor by which the automated assembly of its component parts and sub-assemblies and the relative adjustment thereof are facilitated.

2. Description of the Prior Art

In existing electric motors, difficulties have been experienced in achieving automated assembly of the component parts and sub-assemblies thereof. Further, in such existing electric motors comprising a casing which contains a stator and bearings for a rotor shaft carrying a core, a winding and a commutator engaged by brushes mounted on a brush base or support plate, it has been conventional to adjust the neutral point of the motor following the assembly of its mentioned parts by turning the brush base or support plate relative to the casing and hence relative to the stator fixed in the latter. However, since the brush base or support plate may be slightly eccentric in respect to the axis of rotation of the rotor shaft as established by the bearings in the casing, turning of the brush base or support plate relative to the casing tends to change the conditions of contact of the brushes on the base with the commutator on the rotor shaft. As a result of the foregoing, considerable difficulty has been encountered in adjusting the neutral point of existing electric motors, and the achievement of such adjustment has been a time consuming and costly operation.

OBJECTS AND SUMMARY OF THE INVENTION

Accordingly, it is an object of this invention to provide an electric motor which is constructed and arranged so that the automated assembly of its component parts and subassemblies can be easily effected, and further so that its neutral point can be easily adjusted.

Another object is to provide an electric motor, as aforesaid, in which the adjustment of its neutral point can be effected without altering the contact conditions of the brushes with the commutator.

A further object is to provide an electric motor, as aforesaid, in which damage to lead wires extending from the brushes to the exterior of the motor casing is prevented during adjustment of the neutral point.

Still another object is to provide an electric motor as aforesaid, in which the internal components of the completed motor are effectively shielded so as to permit use of the motor in environments, such as, magnetic tape recorders and the like, where electrical or magnetic fields emanating from the motor would interfere with the operation of adjacent devices, such as, magnetic heads and the like.

In accordance with an aspect of this invention, the automated assembly of an electric motor is facilitated by arranging all of the major components and sub-assemblies thereof so as to permit the same to be successively brought together in one axial direction.

In accordance with another aspect of this invention, an electric motor comprises a first cylindrical case having an end wall at only one end so as to slidably receive, through its other open end, a second magnetic cylindrical case which is relatively shorter than the first case and which opens in the same axial direction for receiving and housing a cylindrical magnet to form a stator, a rotor assembly insertable through the open end of the second case and including a shaft with a core, winding and commutator thereon, a brush base or support plate insertable in the open end of the first cylindrical case so as to bear against the open end edge of the second case and carrying brushes at one side to engage the commutator and a frequency generator at its other side, and a lid member carrying a central thrust bearing for engagement by the respective end of the rotor shaft while the lid member is temporarily held in engagement with the open end of the first cylindrical case for closing the latter and for bearing against the frequency generator carried by the brush base. While the lid member is temporarily held in engagement with the open end of the first cylindrical case, as aforesaid, for example, by means of a plurality of spaced apart tabs provided at the open end of the first case and which are bent inwardly over the surface of the lid member facing away from the frequency generator, the second magnetic cylindrical case with the cylindrical magnet fixed therein is turned relative to the outer or first cylindrical case, for example, by means of a suitable tool which is engaged with sockets in the end wall of the second case through registering arcuate slots formed in the adjacent end wall of the first case.

In accordance with a feature of this invention, the bearings for the rotor shaft are held against seats formed in the end wall of the first cylindrical case and in the lid member, respectively, by means of bearing support springs held between the end walls of the first and second cases and between the frequency generator and lid member, respectively, and means are provided for preventing rotation relative to the first case of the bearing support spring held between the end walls of the first and second cases, for example, in the form of teeth struck from such bearing support spring to bite into the adjacent end wall of the first case, so that the bearings will not be displaced or shifted during the adjustment of the neutral point as described above.

In accordance with another feature of this invention, the brush or support plate and the first cylindrical case are provided with interengageable means, for example, in the form of an outwardly directed projection on the periphery of the brush base which engages in an axial slot opening at the open end edge of the first cylindrical case, for preventing turning of the brush base relative to the first cylindrical case during the described turning of the stator or second cylindrical case and magnet for adjusting the neutral point.

In accordance with still another feature of the invention, lead wires extending from the brushes to the exterior of the lid member are passed through axial bores formed in a bobbin for a coil or winding of the frequency generator so as to positively protect such lead wires or conductors from damage during adjustment of the neutral point.

Finally, in accordance with a further feature of this invention, both the first or outer cylindrical case and the lid member are formed of aluminum and, following adjustment of the neutral point as described above, the open end edge portions of the first cylindrical case intermediate the previously mentioned tabs provided for temporarily holding the lid member in engagement therewith are bent or curled inwardly against the lid member for securely clamping the stator, that is, the second cylindrical case with the magnet therein, and the brush base with the brushes and frequency generator between the end wall of the first aluminum case and the aluminum lid member, whereupon the aluminum case and lid member function to shield all of the internal components of the motor.

The above, and other objects, features and advantages of the invention, will be apparent in the following detailed description of an illustrative embodiment which is to be read in connection with the accompanying drawings.

DESCRIPTION OF A PREFERRED EMBODIMENT

Figure 1:
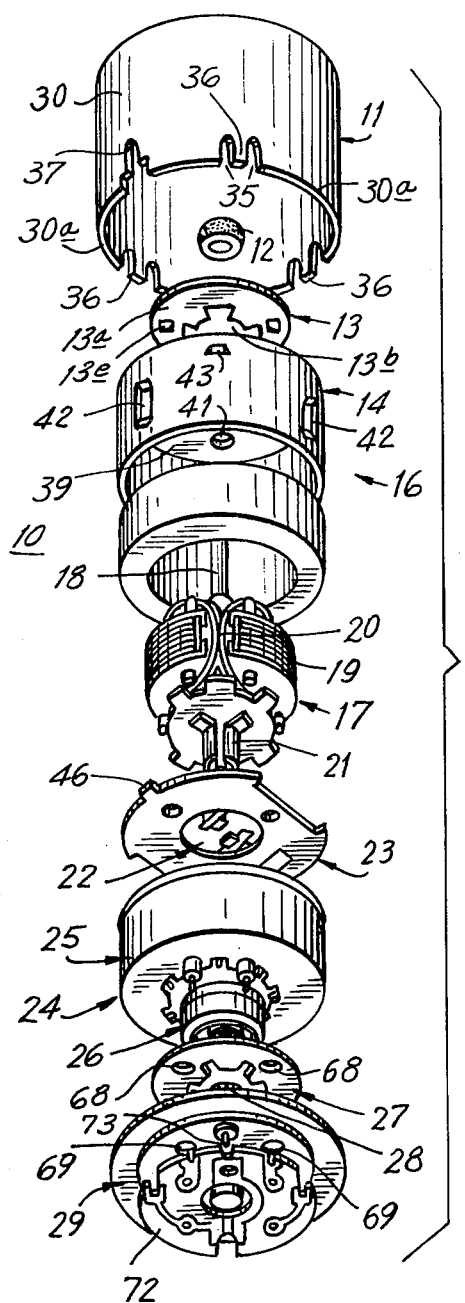
FIG. 1 is an exploded perspective view showing the major components and sub-assemblies which are assembled together to form the motor body of an electric motor according to an embodiment of this invention.

Referring to the drawings in detail, and initially to FIG. 1 thereof, it will be seen that the motor body 10 of an electric motor according to an embodiment of this invention generally comprises the following components and sub-assemblies which are named in the order in which the same appear from the top to bottom of FIG. 1:

A first or outer cylindrical case 11; an upper shaft bearing 12; a bearing support spring 13 for the bearing 12; a second or inner cylindrical case 14 which, with a cylindrical magnet 15 forms a stator assembly 16; a rotor assembly 17 including a shaft 18, on which a core 19, a winding 20 and a commutator 21 are mounted; a brush assembly 22 mounted on the upper side of a brush base or support plate 23; a frequency generator 24 including a stationary portion 25 which is adapted to be mounted at the underside of brush base 23 and a rotary portion 26 adapted to be mounted on the lower end portion of rotor shaft 18; a bearing support spring 27 for a lower rotor shaft bearing 28; and a lid member 29.

Figure 3:
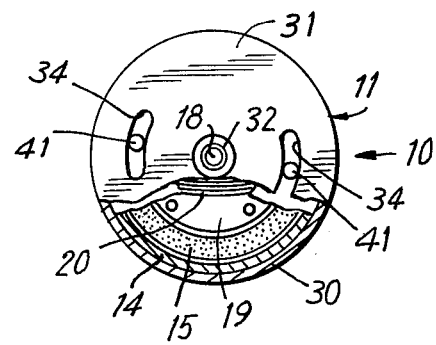
FIG. 3 is a top plan view, partly cut away and in section, of the motor body assembled from the components and sub-assemblies of FIG. 1.
Figure 2:
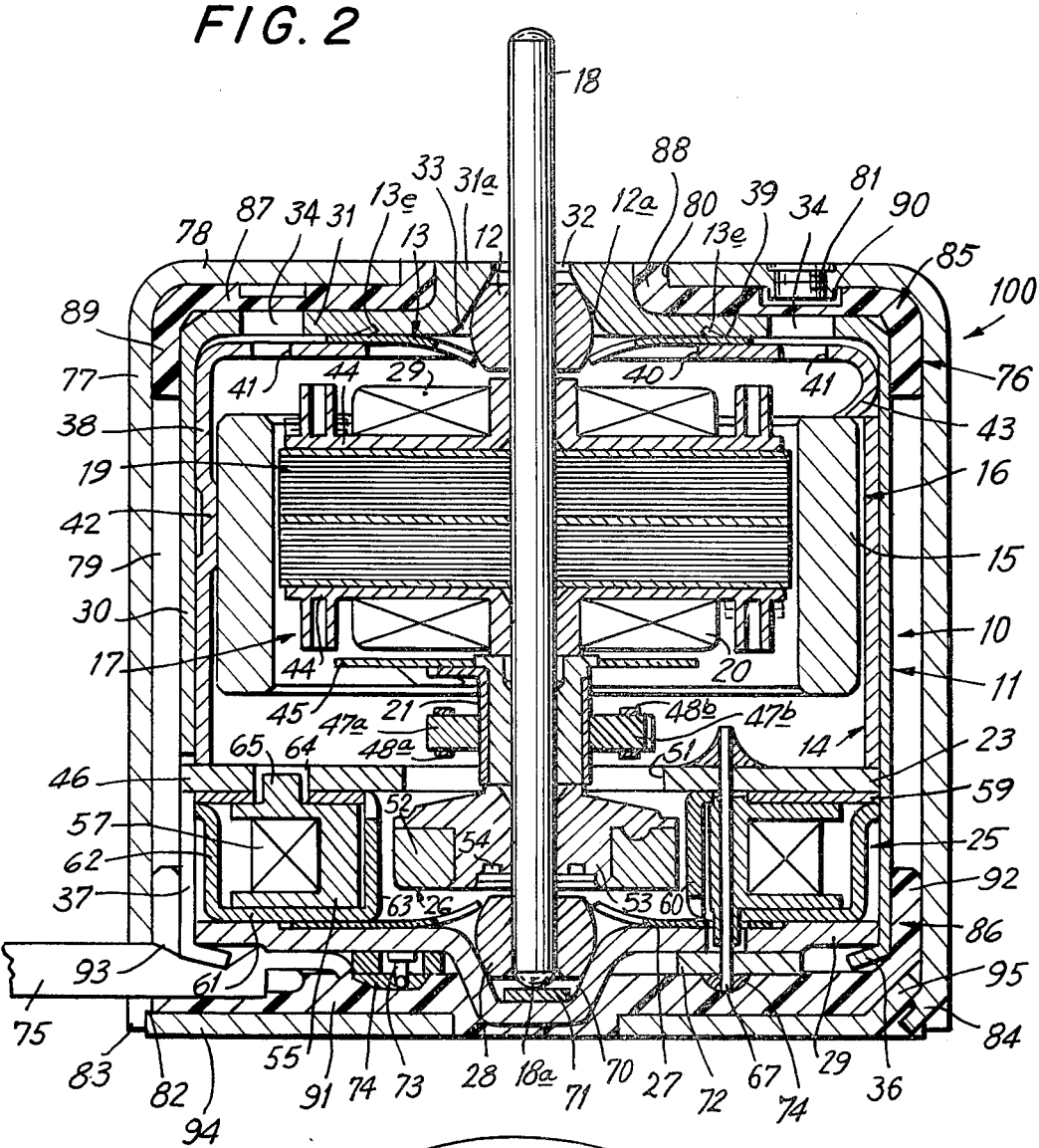
FIG. 2 is an enlarged, sectional view taken through the axis of a completed electric motor according to this invention.

As shown in FIGS. 1, 2 and 3, the first or outer cylindrical case 11 which is formed of a non-magnetic metal, such as, aluminum or the like, has a cylindrical side wall 30 and an end wall 31 only at the upper end thereof, and such end wall 31 has a central opening or bore 32 and a frusto-conical bearing seat 33 leading to the bore 32 from the undersurface of end wall 31. The end wall 31 of case 11 further has a pair of diametrically opposed arcuate slots extending therethrough in concentric relation with the central bore 32 (FIGS. 2 and 3). As shown particularly on FIG. 1, the free or lower edge portion of side wall 30 at the open end of cylindrical case 11 is formed with a plurality of pairs of spaced apart, downwardly opening notches 35 to define respective tabs 36 therebetween. The lower portion of side wall 30 is further shown to be formed with an axial slot 37 which opens at the free edge of side wall 30.

Figure 4:
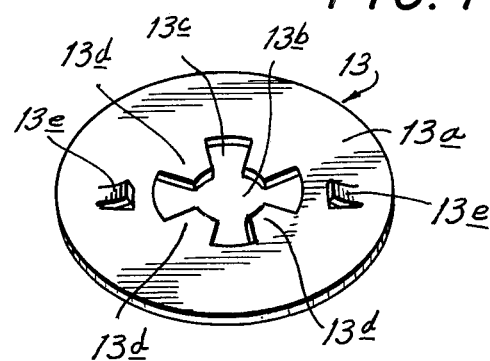
FIG. 4 is a detail perspective view of a bearing support spring which is provided for one of the rotor shaft bearings in the motor according to this invention.

The upper rotor shaft bearing 12, which is preferably of the oil-less type, is shown to have an axial bore extending centrally therethrough for receiving the rotor shaft 18 and a spherical outer surface 12a for engagement with the frusto-conical seat 33 in end wall 31. The bearing support spring 13 is shown on FIG. 4 to be constituted by a disc 13a of spring metal having a central opening 13b with a plurality of notches 13c extending radially outward from opening 13b so as to define resilient fingers 13d between such notches 13c. When the disc 13a is pressed upwardly against the undersurface of end wall 31 of case 11, as shown in FIG. 2, the resilient fingers 13d engaging bearing 12 are flexed so as to resiliently hold such bearing against seat 33. Further, in accordance with this invention, disc 13a has teeth 13e struck upwardly therefrom to engage or bite into the undersurface of end wall 31 for preventing rotation of bearing support spring 13 relative to case 11 during adjustment of the neutral point of the motor, as hereinafter described.

The inner or second cylindrical case 14 is formed of a magnetic metal, such as, iron, and is shown to include a cylindrical side wall 38 and an end wall 39 only at the upper end of case 14, with such end wall 39 having a relatively large diameter central opening 40 therein (FIGS. 1, 2 and 3). The case 14 is diametrically dimensioned so as to be slidably insertable in the first or outer case 11 through the open lower end of the latter, and the side wall 38 of the inner or second case 14 has a substantially smaller axial length than the side wall 30 of outer case 11. The end wall 39 of inner case 14 has diametrically opposed openings or sockets 41 which are located to register with arcuate slots 34 of outer case 11 when inner case 14 is inserted in the latter. Side walls 38 of case 14 is formed with a plurality of circumferentially spaced apart indentations 42 which are adapted to frictionally engage the outer surface of cylindrical magnet 15 for securely holding the latter relative to case 14 when the magnet is inserted axially into case 14 through the open lower end of the latter. Further, projections 43 are struck inwardly from side wall 38 of case 14 adjacent end wall 39 so as to be engageable by the upper end surface of magnet 15 (FIG. 2) for establishing the axial position of the magnet relative to case 14.

In the rotor assembly 17, the core 19 may be composed of a number of iron laminations held on shaft 18 between holders or supports 44 for the winding 20 which, with the core 19 forms a rotor, and a commutator support plate 45 extends around shaft 18 below the rotor and has the commutator 21 depending from such support plate 45.

The brush base or support plate 23 (FIGS. 1, 2 and 5) is constituted by a substantially circular disc which is diametrically dimensioned to be inserted axially into outer case 11 through the lower open end of the latter and to bear axially against the free end edge of side wall 38 of the inner case 14. In order to prevent turning of brush base 23 relative to outer case 11 when inserted in the latter, brush base 23 has an outwardly directed projection 46 extending from its periphery and being engageable in the axial slot 37 in the lower portion of side wall 30.

Figure 5:
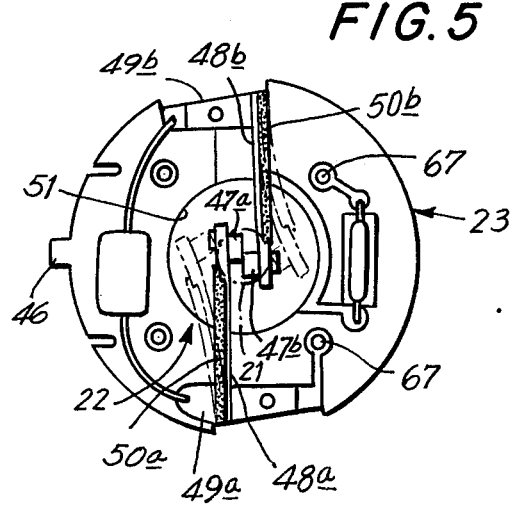
FIG. 5 is a detail plan view of a brush and base subassembly included in the motor according to this invention.

As shown particularly on FIG. 5, brush assembly 22 may comprise two brushes 47a and 47b which are mounted in substantially confronting relation on the inner ends of brush supporting strips 48a and 48b of spring metal. The outer end portions of brush supporting strips 48a and 48b are secured to respective mounting brackets 49a and 49b which are suitably secured on the upper surface of brush base 23 so that strips 48a and 48b tend to extend parallel to each other with the respective brushes 47a and 47b abutting, as shown in full lines on FIG. 5. However, the brush supporting strips 48a and 48b are capable of flexing away from each other, for example, to the positions shown in broken lines on FIG. 5, so as to permit the respective brushes 47a and 47b to engage the commutator therebetween when the motor body 10 is assembled, as hereinafter described. Preferably, strips 50a and 50b of rubber or other damping material are laminated to the surfaces of brush support strips 48a and 48b which face away from each other for damping oscillations of such resilient brush support strips and thereby ensuring stable contact of the brushes 47a and 47b with the commutator 21. Further, as is shown on FIG. 5, the brush base or support plate 23 has a central opening 51 with a diameter which is substantially larger than the diametrical distance between the inner ends of the brush supporting strips 48a and 48b when the latter are spaced apart sufficiently, as shown in broken lines, to permit the engagement of the commutator 21 between the respective brushes 47a and 47b.

The frequency or signal generator 24 which may be provided for generating signal pulses at a frequency corresponding to the rotational speed of the shaft 18 of the motor comprises, as mentioned before, the stationary portion 25 which is of generally annular configuration (FIG. 6) and the rotary portion 26 which is mounted on shaft 18 below commutator 21 so as to be rotatable with the shaft within the annular stationary portion 25. The rotary portion 26 is shown on FIG. 2 to include a ring-shaped magnet 52 which is magnetized to provide alternately arranged opposite magnetic poles N-S-N-S - - - - along its outer peripheral surface, and which is mounted on the shaft 8 by means of a suitable annular holder 53 having an oil groove 54 in its downwardly facing surface.

Figure 6:
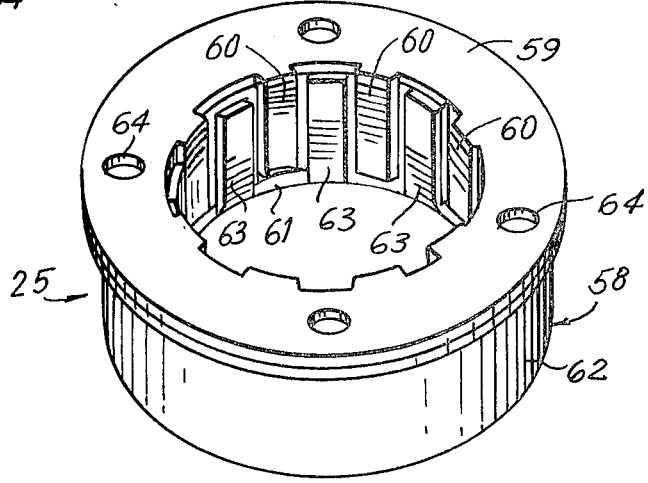
FIG. 6 is an enlarged perspective view of a stationary portion of a frequency generator that is included in the illustrated embodiment of this invention.

The stationary portion 25 of frequency generator 24 is shown to include an annular bobbin 55 (FIG. 2) of insulating material which has a relatively thick inner peripheral portion with flanges directed radially outward from the latter to define an annular groove 56 in which a winding 57 is disposed. The bobbin 55 with winding 57 thereon is contained within an annular magnetic yoke structure 58 (FIGS. 2 and 6). As shown, the annular yoke structure 58 may include a flat ring member 58 of iron or other magnetic material formed with a plurality of circumferentially spaced apart tooth-like elements 60 extending downwardly from its inner peripheral edge. The yoke structure 58 further includes a lower, substantially flat ring member 61, also of iron or other magnetic material, and having an upwardly directed flange 62 extending from its outer peripheral edge to engage the undersurface of ring member 59 adjacent the outer periphery of the latter, while a plurality of circumferentially spaced apart tooth-like elements 63 are directed upwardly from the inner periphery of ring 61 so as to be interspersed between the tooth-like elements 60, as particularly shown on FIG. 6. The spacing of the alternately arranged tooth-like elements 60 and 63 of yoke structure 58 is made to substantially correspond to the alternate arrangement of the north and south poles about the outer periphery of ring magnet 52 so that the rotation of the latter within the annular stationary portion 25 of the frequency generator will induce pulse signals in winding 57. The upper and lower ring members 59 and 61 of yoke structure 58 are formed with spaced apart openings, for example, as at 64 on FIG. 6, for accommodating bosses 65 that extend from bobbin 55. Further, in accordance with this invention, the relatively thick inner peripheral portion of bobbin 55 has conductor pins 67 extending axially therethrough and through respective holes in ring members 69 and 61 so that the upper end portions of pins 67 can project upwardly through suitable openings in brush base 23 for electrical connection, at the upper surface of the latter, to the brush assembly 22, while the lower end portions of conductor pins 67 can, in the assembled condition of the motor body 10, project downwardly through respective holes 68 in bearing support spring 27 and aligned holes 69 in lid member 29.

The bearing support spring 27 for the oil-less bearing 28 may be generally similar to the previously described bearing support spring 13 with the exception that the teeth 13e of the latter may be omitted while the bearing support spring 27 is provided with the holes 68.

The lid member 29 is formed of the same non-magnetic metal as the outer case 11, for example, of aluminum, and is generally in the form of a circular disc which is diametrically dimensioned to fit closely within the opened lower end of case 11. Further, lid member 29 is formed with a central, substantially frusto-conical depression 70 for defining a seat against which the spherical surface of lower bearing 28 can be urged by bearing support spring 27, and a thrust bearing member 71 is provided at the bottom of depression 70 for engagement by the lower end 18a of shaft 18 (FIG. 2). A printed circuit terminal board 72 is provided at the undersurface of lid member 29 (FIGS. 1 and 2) for electrical connection to the lower ends of conductor pins 67 and to a ground pin 73 (FIG. 2) which projects from lid member 29.

The above described components and sub-assemblies are assembled to provide the motor body 10 of an electric motor according to this invention as follows:

Initially, the bearing 12 is inserted axially through the open end of case 11 to engage the respective seat 33, whereupon bearing support spring 13 is similarly inserted so as to rest against end wall 31. Then the inner magnetic case 14 is inserted axially through the open end of case 11 to the position shown on FIG. 2 in which end wall 39 of case 14 presses bearing support spring 13 against end wall 31 and thereby positions spring 13 for retaining bearing 12 against its seat 33. Thereafter, cylindrical magnet 15 is inserted axially through the open end of case 14 until it attains the position shown on FIG. 2 in which magnet 15 abuts against the inwardly struck projections 43 and is securely held by indentations 42. Following such assembly of the stator 16 within outer case 11, rotor assembly 17 is inserted axially into the stator through the open ends of cases 11 and 14 with the end portion of shaft 18 which appears at the top thereof on FIG. 2 being received in bearing 12 and extending through bore 32, and with the commutator 21 being disposed adjacent the open end portion of case 14.

At this point, a sub-assembly comprised of the brush base 23 with the brush assembly 22 at one side thereof and the stationary portion 25 of frequency generator 24 at the other side thereof, and which is held together by the electrical connection to the brush assembly of the ends of conductor pins 67 extending through brush base 23, is axially inserted into outer case 11 through the open end of the latter with the side of brush base 23 carrying the brush assembly 22 facing in the direction toward the interior of case 11. During such insertion of brush base 23 into case 11, brush base 23 is positioned to engage its peripheral projection 46 in axial slot 37. Further, during the insertion of brush base 23 into case 11, a forked or otherwise suitably shaped tool (not shown) is inserted axially through the central opening of the annular yoke structure 58 and through the central opening 51 of brush base 23 so as to spread apart the brush supporting strips 48a and 48b at least to the positions shown in broken lines on FIG. 5 so that the respective brushes 47a and 47b are spaced apart by a distance wider than the diameter of commutator 21 and can embrace the latter. Upon the full insertion of brush base 23 into case 11 so that the outer peripheral portion of brush base 23 bears against the free end edge of side wall 38 of case 14, as shown on FIG. 2, the previously mentioned tool for spreading apart the brush supporting strips 48a and 48b is withdrawn so as to permit such strips to resiliently urge the respective brushes against commutator 21. The rotary portion 26 of frequency generator 24 is now pressed axially onto the end portion of shaft 18 which projects from commutator 21 so as to dispose such rotary portion 26 within the annular yoke structure 58 of the stationary portion 25 of the frequency generator. After the installation of rotary portion 26 of the frequency generator on shaft 18, bearing support spring 27 is placed against ring member 61 of the yoke structure 58 with the conductor pins 67 extending through holes 68 in the bearing support spring, and the bearing 28 is placed on the end portion of shaft 18 projecting beyond rotary portion 26 of the frequency generator. Finally, lid member 29 is placed into the open end of case 11 so as to bear against the adjacent ring member 61 of yoke structure 58 with bearing support spring 27 being held therebetween and the adjacent end portions of conductor pins 67 projecting through holes 69, and further with the spherical surface of bearing 28 engaging seat 70 and the end 18a of shaft 18 engaging thrust bearing 71. With lid member 29 being thus installed, tabs 36 at the open end edge portion of case 11 are bent inwardly against the outer surface of the lid member, as shown on FIG. 2, so as to temporarily hold the lid member in engagement with case 11.

It will be understood that, with the lid member 29 being temporarily held in engagement with case 11 by the circumferentially spaced apart, inwardly bent tabs 36, the lid member 29 is only lightly pressed against the adjacent stationary portion 25 of frequency generator 24 and, therefore, the inner magnetic case 14 is only lightly gripped between brush base 23 and end wall 31 of outer case 11. Thus, with the lid member 29 temporarily held in engagement with outer case 11, adjustments of the magnetic neutral point of the motor and of the axis of rotor shaft 18 for eliminating any swaying thereof can be conveniently effected. In effecting adjustment of the magnetic neutral point, a suitable tool is inserted through arcuate slots 34 in end wall 31 of outer case 11 into openings or sockets 41 in the adjacent end wall 39 of inner magnetic case 14 for turning the stator 16, that is, the inner magnetic case 14 and cylindrical magnet 15, as a unit, relative to outer case 11, and hence relative to brushes 47a and 47b on brush base 23. It will be apparent that, by reason of the engagement of projection 46 on brush base 23 in axial slot 37 of outer case 11, brush base 23 is held against turning relative to outer case 11 during turning of stator 16 relative to the brushes. It will also be seen that, during the turning of the stator 16 relative to outer case 11 for adjusting the neutral point, the teeth 13e struck from bearing support spring 13 which is held between end walls 31 and 39 of cases 11 and 14 bite into end wall 31 so as to prevent turning of bearing support spring 13 relative to outer case 11, thereby to prevent disturbance of the position of bearing 12. Of course, the other bearing support spring 27 is held between the stationary portion 25 of frequency generator 24 and lid member 29 which are not turned during adjustment of the neutral point so that the position of the respective bearing 28 is also not disturbed. Therefore, the adjustment of the neutral point can be effected without altering the previous adjustment of the axis of rotor shaft 18 and, hence, without changing the condition of contact of brushes 47a and 47b with commutator 21. It will also be appreciated that, since brush base 23 carrying the brushes 47a and 47b is not turned during adjustment of the neutral point and the electrical connections extending from the brushes to the outside of lid member 29 include the conductor pins 67 extending through brush base 23, bobbin 55 and lid member 29, such electrical connections do not interfere with the adjustment of the neutral point and cannot be damaged during such adjustment.

After the adjustment of the neutral point as described above, the free end edge portions 30a of side wall 30 of the non-magnetic outer case 11 which extend between the tabs 36 (FIG. 1) are bent or curled inwardly against the outer surface of lid member 29 so as to tightly press the latter against the adjacent stationary portion 25 of frequency generator 24 and thereby permanently secure lid member 29 to outer case 11. It will be apparent that, when lid member 29 is thus permanently secured to case 11, bearing support spring 13, inner magnetic case 14 of stator 16, brush base 23, stationary portion 25 of the frequency generator and bearing support spring 27 are all firmly clamped between end wall 31 of outer case 11 and lid member 29 so that the adjusted neutral point and the positions of rotor shaft bearings 12 and 28 are thereafter securely maintained.

After lid member 29 has been securely fixed to case 11, as described above, the printed terminal board 72 is applied against the outer surface of lid member 29, and the ground pin 73 and the ends of conductor pins 67 which project from lid member 29 through respective holes in terminal boards 72 are then electrically connected, as by solder indicated at 74 (FIG. 2) to the respective terminals on board 72. In order to complete the construction of the motor body 10, lead wires extending from a conventional cable 75 are suitably electrically connected to respective terminals on terminal board 72.

As shown particularly on FIG. 2, a complete electric motor 10 including the previously described motor body 100 further comprises a protective housing 76 for the motor body 10. Such protective housing 76 which may be formed of a magnetic material, such as, iron or the like, is of generally cylindrical configuration and includes a cylindrical side wall 77 and an end wall 78 extending from only one end of said wall 77 so that housing 76 is open at the end thereof remote from end wall 78. The inner diameter of side wall 77 is substantially larger than the outer diameter of side wall 30 of the non-magnetic case 11 so that, when motor body 10 is installed in protective housing 76, an annular gap 79 is provided between side walls 30 and 77. The end wall 78 of housing 76 is formed with a central opening 80 having a diameter substantially larger than the outer diameter of a collar 31a extending from end wall 31 of case 11 about the bore 32. Further, end wall 78 of the protective housing has a plurality of tapped bores 81 extending therethrough and being equally spaced apart along a circle concentric with opening 80. The free end edge of side wall 77 has a rabbet 82 at its inner surface, and the free end portion of side wall 77 is further formed with a cutout 83 opening at the adjacent edge for accommodating the cable 75 and also with pairs of spaced notches opening at the end edge for defining therebetween a plurality of tabs 84.

In order to cushion motor body 10 within protective housing 76, the motor 100 is further shown to include cushioning members 85 and 86, for example, of rubber, which are interposed between protective housing 76 and outer case 11 of the motor body at the opposite ends of the latter. The cushioning member 85 may include a substantially flat annular portion 87 to be interposed between end walls 31 and 78 and having a rim 88 along its inner periphery to extend between the edge of opening 80 and the collar 31a and an oppositely directed flange 89 at the outer periphery of annular portion 87 to extend in the gap 79 between side walls 30 and 77. Further, annular portion 87 of cushioning member 85 may have an annular groove 90 located to register with the tapped bores 81 in end wall 78. The other cushioning member 86 may be generally in the form of a disc 91 shaped to cover terminal board 72 at the adjacent end of motor body 10 and having a flange 92 extending from its outer periphery to be received in the gap 79 between side walls 30 and 77. The flange 92 is formed with a cutout 93 through which cable 75 may extend. The motor 100 is completed by a cover 94 for the open end of housing 76 and which may be formed of the same material as the latter. The cover 94 is generally circular and diametrically dimensioned to seat, at its outer peripheral edge, in rabbet 82. Further, the cover 94 is formed, at its outer periphery, with a plurality of angled ramps 95 which are circumferentially located so as to register with the tabs 84.

In assembling the motor body 10 with the remaining above described components to form the completed motor 100, the cushioning member 85 is disposed over the respective end portion of case 11 with the rim 88 of the cushioning member extending around collar 31a. Then, the motor body 10 with the cushioning member 85 thereon is inserted axially into protective housing 76 through the open end of the latter so as to dispose rim 88 of cushioning member 85 in opening 80 of the end wall 78. The cable 75 containing the lead wires for the motor is then arranged in cutout 83 adjacent the open end of the protective housing, and the cushioning member 86 is engaged over the end of casing 11 closed by lid member 29 with the cutout 93 in the flange 92 of cushioning member 86 being registered with the cutout 83 for the passage of cable 75 therethrough. Finally, cover 94 is seated, at its periphery, in rabbet 82 at the open end of housing 76 with the angled ramps 95 of the cover being aligned with tabs 84 of the housing. Thereupon, the tabs 84 are bent inwardly against the respective angled ramps 95, as shown on FIG. 2, for securing cover 94 in respect to housing 76 with such cover bearing against the adjacent cushioning member 86.

It will be apparent from the previous description of the assembly of the motor body 10 and of the latter with the protective housing 76 that all of the components of the motor 100 may be successively brought together in one axial direction so as to facilitate the automated assembly of the motor 100. Further, in the assembled motor body 10, the non-magnetic case 11 and lid member 29 are closely and securely engaged with each other by the described inward curling of the edge portions 30a of case 11 so as to provide a substantially tight non-magnetic envelope around the operating components of the motor. Therefore, an effective electrostatic shield is provided to prevent the generation of electrical noise in electronic devices or the like operating near to the motor. Finally, since the motor body 10 according to this invention is protected within the housing 76 by the cushioning members 85 and 86, noise and vibration are eliminated and the resistance of the motor to damage from impacts applied to the housing 76 is increased.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An electrical motor comprising:
    a first cylindrical case having an end wall only at one end thereof with a central bore in said end wall;
    a second cylindrical case containing a cylindrical magnet and having an end wall only at one end thereof with a central opening therein, said cylindrical case having an axial length substantially smaller than that of said first cylindrical case and being slidably insertable into said first cylindrical case through the other end of the latter to dispose the end walls of said first and second cases adjacent each other;
    a brush base inserted into said first cylindrical case through said other end of the latter so as to bear against the other end edge of said second cylindrical case, said brush base having brush means mounted on the surface thereof facing toward said second cylindrical case, and frequency generating means mounted against the opposite surface of said brush base;
    a lid member having a central thrust bearing portion and being shaped to bear axially against said frequency generating means while being engaged with said other end of the first cylindrical case for closing the latter;
    means for temporarily holding said lid member in engagement with said other end of the first cylindrical case; and
    means for rotationally adjusting said second cylindrical case relative to said first cylindrical case from the exterior of the latter while said lid member is temporarily held in engagement with said first cylindrical case so as to adjust the neutral point of said brush means relative to said cylindrical magnet.

2. An electric motor according to claim 1; in which said means for rotationally adjusting said second cylindrical case relative to said first cylindrical case includes arcuate slots in said end wall of said first case concentric with the axis of the latter, and sockets in said end wall of said second case registering with said arcuate slots so as to be accessible through said slots to a tool for turning said second case.

3. An electric motor according to claim 1; in which said means for temporarily holding said lid member in engagement with said other end of the first case includes a plurality of spaced apart tabs at said other end of the first case which are bent inwardly over the surface of said lid facing away from said frequency generating means.

4. An electric motor according to claim 3; in which said other end of the first cylindrical case extends beyond said lid member when the latter bears against said frequency generating means and, after the adjustment of said neutral point, said other end of the first case, intermediate said tabs, is bent inwardly against said surface of the lid member for securely clamping said second case with said magnet therein and said brush base with said brush means and frequency generating means between said end wall of said first case and said lid member.

5. An electric motor according to claim 4; in which said first cylindrical case and said lid member are of aluminum so that the motor is shielded thereby after said other end of the first case is bent inwardly against said surface of the lid member.

6. An electric motor according to claim 1; in which said first cylindrical case and said brush base have interengageable means for preventing rotational movement of said brush base relative to said first case during the adjustment of said neutral point.

7. An electric motor according to claim 6; in which said interengageable means include an outwardly directed projection on the periphery of said brush base, and an axial slot in said first case opening at said other end of the latter for receiving said projection.

8. An electric motor according to claim 1; in which said end wall of the first case has a first bearing seat leading to said bore, and said lid member has a second bearing seat leading to said thrust bearing portion; and further comprising a rotor assembly including a shaft having one end portion extending through said bore and its other end seating axially against said thrust bearing portion, first and second bearing members engaging said first and second bearing seats, respectively, and receiving said shaft, a bearing support spring held between said end walls of said first and second cylindrical cases and urging said first bearing member against said first seat, and means for holding said bearing support spring against rotational movement relative to said first case during the adjustment of said neutral point.

9. An electric motor according to claim 8; in which said means for holding the bearing support spring against rotational movement includes teeth struck from said bearing support spring and engaging said end wall of the first cylindrical case.

10. An electric motor according to claim 8; further comprising a second bearing support spring held between said frequency generating means and said lid and urging said second bearing member against said second seat.

11. An electric motor according to claim 1; in which said frequency generating means includes a bobbin and a coil wound on said bobbin, and said bobbin has conductors extending axially therethrough to pass, at one end, through said brush base for connection to said brush means and, at the other end, to pass through said lid member.

* * * * *